July 1, 1952     J. F. McCALL     2,601,993
COMBINED HITCH AND TRAILER GUARD
Filed Feb. 2, 1948
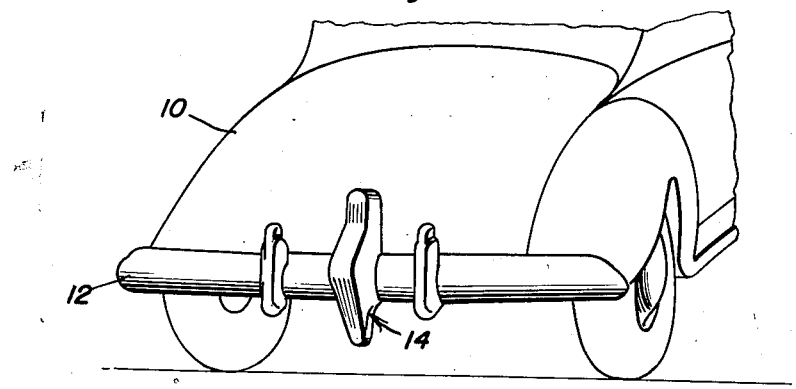
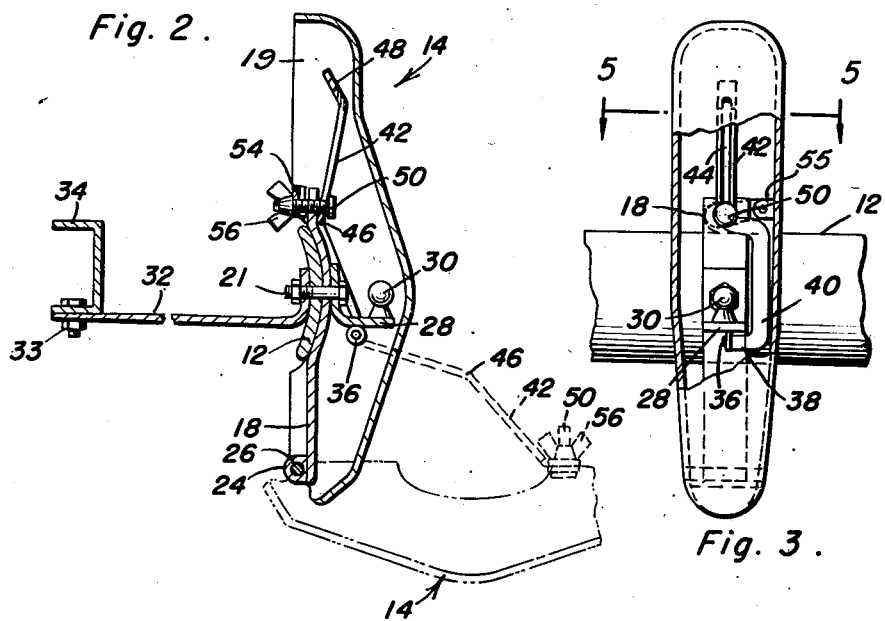
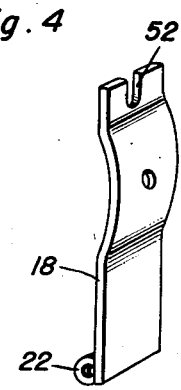
Inventor
John F. McCall
By Clarence A. O'Brien
and Harvey B. Jacobson
Attorneys Patented July 1, 1952

2,601,993

UNITED STATES PATENT OFFICE 2,601,993

COMBINED HITCH AND TRAILER GUARD

John F. McCall, Minneapolis, Minn.

Application February 2, 1948, Serial No. 5,881

3 Claims. (Cl. 280—33.44)

This invention relates to a trailer hitch in combination with a bumper guard and has for its principal object to provide a trailer hitch supported by a bumper of a motor vehicle or the like with a bumper guard adapted to overlie and conceal the hitch construction when a trailer is not hitched to the motor vehicle.

Another object of this invention is to provide a connection from the hitch construction on the bumper to the frame of the vehicle so that a direct pull is realized from the motor vehicle to the trailer and the strain of the draft is carried to the frame. This obviates the tendency of the weight of the trailer to deform or weaken the bumper.

A further object of this invention is to provide a guard for a bumper of a motor vehicle designed to conceal the trailer hitch construction, when it is not in use, and adapted to be locked in an angular plane below the hitch construction, when a trailer is connected to the vehicle.

A still further object of this invention is to provide a bumper guard adapted to conceal the hitch construction and also sturdily constructed and attached to the bumper so as to protect the trunk or rear end of the vehicle from dents and minor damage from rear end collisions.

Another feature of this invention is to pivotally secure a bumper guard to the bumper of a motor vehicle so as to conceal the hitch assembly when in vertical position and to permit the hitch bar to be utilized to support a drawbar thereon when in a horizontal position below the hitch construction and at right angles to the bumper.

Another object is to utilize a slotted thin bar as a locking member to support and lock the bumper guard in either selected position.

Another object of this invention is to provide a combination trailer hitch and bumper guard that is simple and inexpensive to manufacture, easily attached to the bumper of a car and designed and adaptable for use with any make or type of motor vehicle.

The full features and other ancillary objects will appear more clearly in the detailed description to follow and in the drawings, wherein:

Figure 1 is a perspective view of the bumper guard shown attached to the rear bumper of a car and concealing the hitch construction;

Figure 2 is a side elevational view of this device with a side of the guard broken away to exemplify the hitch construction;

Figure 3 is a fragmentary rear elevation of the invention;

Figure 4 is a detailed view of the bumper guard support plate shown generally in Figure 2; and Figure 5 is a transverse sectional view taken substantially on the line 5—5 of Figure 3.

With reference to the drawings, wherein similar characters of reference refer to identical parts throughout, and in particular Figure 1, there is shown an automobile 10, of conventional make and design, having a rear bumper 12, attached thereto by usual construction.

Secured to the bumper is a bumper guard 14 which may be cast as one piece or otherwise constructed of any suitable sturdy material. The guard comprises sides 13—15 formed integrally with the face portion 17 and rounded at the edges. One of the sides 15 has an inwardly extending flange 54 pivotally secured adjacent the end thereof and designed to support locking means for the bumper guard, to be described more fully hereinafter. The edges of the sides 13, 15 are curved inwardly midway their extremities, to conform to the outwardly curved contour of the bumper and are adapted to fit flush with the outer surface of the bumper when in a vertical guarding position. The hitch construction, when not in use, and when the bumper guard is in a vertical position, fits within the well or chamber 19 formed by the sides and face of the guard.

A support plate 18 is provided to secure the guard to the bumper and comprises a substantially flat plate slightly outwardly curved to fit the contour of the bumper to which it is secured, flush against the outer surface thereof, by a bolt 21 inserted through a suitable aperture in the plate and bumper. A sleeve 22 is formed on the inner surface of the plate adjacent the downwardly extending end which lies in a plane below the bumper, and pivotally secures the bumper guard to the bumper by means of a pivot pin 26 inserted through apertured ears 24 on the guard and the sleeve 22.

An angle iron 28 serves as the hitch plate, one end of the plate being secured to the bumper by means of the bolt 21 passing through a suitable aperture formed therein. The other end extends rearwardly from the bumper in a horizontal plane and has a suitable opening to detachably support a drawbar (not shown) by means of a conventional ball and socket hitch 30 for hitching a trailer to the motor vehicle 10.

Suitable means are provided to carry the strain of the weight of the trailer directly to the frame to prevent the deformation of the bumper and includes a connecting bar 32 having one end bent upwardly and apertured so as to be bolted to the inner surface of the bumper by bolt and nut 21. A U-shaped or channel bar 34 is secured to the top surface of the connecting bar at the other end thereof by conventional means such as bolt and nut 33, and is adapted to clamp on the center bar of the frame of the car.

Of course, means are provided to lock the bumper guard in either a horizontal position or a vertical guard position, as shown in Figure 2 of the drawings and comprises a bearing 36, which is secured to the undersurface of the hitch plate 28 adjacent one side thereof and designed to receive a bearing sleeve 38 formed integrally with and extending at right angles from a locking bar 40. The locking bar 40 is substantially U-shaped and terminates in a lateral upwardly extending arm 42, having a longitudinal slot 44 formed therein. The upwardly extending slotted arm 42 is angularly bent from the U-shaped body portion 40 as at 46 and extends outwardly therefrom, with terminating portion 48 being angularly bent from the plane of the bar, as shown in Figure 2. The angular bend 48 serves as a retaining seat, when the guard is in a horizontal position.

The bolt 50 extends through the slot 44 in the arm 42, with the head portion slidably received on the outer portion of the arm and secures the bar to the support plate 18, the bolt 50 being seated or received within a peripheral U-shaped notch 52 disposed in the extending portion of the support plate 18. An apertured ear or plate 54 is pivotally secured to a small integral flange 55 extending laterally from the opposite side wall 15 of the bumper guard and is provided to receive the bolt 50 therethrough, a wing nut 56 being utilized to secure the connection.

Thus, it can be seen, with reference to Figure 2 of the drawings, that when it is desired to utilize the trailer hitch and secure a trailer to the extending hitch 28 by means of the ball and socket connection 30, the wing nut 56 is removed from the bolt 50 and the guard 14 is pivoted on pin 26. The bolt 50 is moved upwardly through the slot 44 in the arm 42 and when the guard 14 reaches its extended horizontal position, with the bolt 50 received in the angularly bent terminal 48, the wing nut 56 is re-threaded on the shank of the bolt 50 and the guard is secured in a horizontal position, obviating the tendency of the guard to become broken or loose, when the car and trailer travel over bumpy roads.

Thus, it can be seen that there is provided a combination bumper guard and trailer hitch designed for all-purpose use and possessing many potentialities, inexpensive to manufacture, easy to install and efficiently operate with any type of automobile and provided to serve a dual capacity, as a bumper guard and trailer hitch assembly camouflage member.

The foregoing drawings and description have been illustrative and descriptive of one form of the invention and various changes in size or style or otherwise many be effected thereon by any person skilled in the art, without departing from the scope of the invention as expressed in the claims.

Having described the invention what is claimed as new is:

1. In combination with an automobile having a bumper, a trailer hitch and bumper guard including a supporting plate, having one end secured to the outer surface of a bumper, a sleeve formed on the other end below the bumper, a bumper guard pivoted to said sleeve for vertical swinging movement, means for locking said guard in selected raised or lowered positions, an angle iron secured at one end to the outer surface of the support plate, means secured to said angle iron to attach a trailer thereto, a connecting bar secured to the inner surface of the bumper, a channel bar secured to the other end of the connecting bar for clamping engagement with the frame of the automobile, said locking means for the bumper guard including a bearing attached to the under surface of the extension end of the angle iron, a slotted rod pivotally secured thereon, means slidably received in said slot for securing said rod to the guard and supporting plate.

2. In combination with an auotmobile having a bumper, a supporting plate secured to said bumper and extending therebelow, a hitch plate secured with said supporting plate to the bumper, means carried by the hitch plate for coupling the draw bar of a trailer thereto, a bumper guard pivotally secured to said supporting plate for vertical swinging movement, means for securing said bumper guard in selected raised or lowered positions including a locking arm pivotally carried by the hitch plate, an apertured ear pivotally associated with the guard and means for securing said arm and ear to the supporting plate and for locking said guard in a lowered position, said arm terminating in an offset unattached extremity forming a seat for said means when the guard and arm are in a lowered position.

3. A trailer hitch and guard therefor comprising a plate, means carried by the plate to secure the same to a towing vehicle, means carried by and projecting from the plate for detachably coupling a trailer thereto, a casing pivoted to the plate for swinging movement toward and away from said last means, and a common means including a locking arm pivotally connected to the plate and securing means carried by the casing engaging the arm for selectively retaining the casing in a position adjacent to or remote from the coupling means, said arm being provided with a longitudinal slot, said securing means consisting of a clamp slidable in said slot and operable to frictionally engage the arm, said plate being provided with a notch in the edge thereof and which notch is disposed in the arc of travel of said clamp, said clamp being selectively in said notch to urge said plate and arm into frictional engagement.

JOHN F. McCALL.

REFERENCES CITED

The following references are of record in the file of this patent:

UNITED STATES PATENTS

| Number | Name | Date |
|--------|------|------|
| 502,067 | Clark | July 25, 1893 |
| 2,097,006 | Weis | Oct. 26, 1937 |
| 2,342,907 | Stall | Feb. 29, 1944 |
| 2,446,347 | Walkowiak | Aug. 3, 1948 |
| 2,510,782 | Johnson | June 6, 1950 |